US008945394B2

(12) United States Patent
Kincaid et al.

(10) Patent No.: US 8,945,394 B2
(45) Date of Patent: *Feb. 3, 2015

(54) SYSTEM, METHODS, PROCESSES AND APPARATUS FOR REMOVING FINELY DISPERSED PARTICULATE MATTER FROM A FLUID STREAM

(75) Inventors: Patrick D. Kincaid, Hanover, MA (US); Robert P. Mahoney, Newbury, MA (US); David Soane, Chestnut Hill, MA (US)

(73) Assignee: Soane Energy, LLC, Cambridge, MA (US)

( * ) Notice: Subject to any disclaimer, the term of this patent is extended or adjusted under 35 U.S.C. 154(b) by 839 days.

This patent is subject to a terminal disclaimer.

(21) Appl. No.: 12/846,021

(22) Filed: Jul. 29, 2010

(65) Prior Publication Data

US 2011/0094970 A1  Apr. 28, 2011

Related U.S. Application Data

(60) Provisional application No. 61/255,155, filed on Oct. 27, 2009.

(51) Int. Cl.
*B01D 21/00* (2006.01)
*C02F 1/52* (2006.01)
(Continued)

(52) U.S. Cl.
CPC ............ *B01D 21/01* (2013.01); *B01D 21/0012* (2013.01); *B01D 21/267* (2013.01);
(Continued)

(58) Field of Classification Search
USPC ................................. 210/702–738, 767, 788
See application file for complete search history.

(56) References Cited

U.S. PATENT DOCUMENTS 3,352,424 A  11/1967 Guebert et al.
3,723,310 A   3/1973 Lang et al.
(Continued)

FOREIGN PATENT DOCUMENTS

AU       640296      6/1992
CN   101087733 A    12/2007
(Continued)

OTHER PUBLICATIONS

U.S. Appl. No. 12/792,181, Soane et al.
(Continued)

*Primary Examiner* — Nam Nguyen
*Assistant Examiner* — Nader Hossaini
(74) *Attorney, Agent, or Firm* — Elmore Patent Law Group, P.C.; Mahreen Chaudhry Hoda; Carolyn S. Elmore, Esq.

(57) ABSTRACT

Disclosed herein are systems and methods for removing fine particulate matter from a fluid, comprising a separator that separates an inflow fluid stream into an overflow fluid path and an underflow fluid path, where the underflow fluid path is treated with a tethering material that attaches to the coarse particulate matter to form tether-bearing anchor particles and where the overflow fluid path is treated with an activating material so that the activating material interacts with the fine particulate matter to form activated particles. After these treatments, the underflow fluid path containing the tether-bearing anchor particles is commingled with the overflow fluid path containing the activated particles, so that a removable complex is produced that can be removed in a settling facility, thereby removing the fine particulate matter from the fluid. The systems and methods are particularly advantageous for removing particulate matter from a fluid waste stream following mining or ore processing operations, such as oil sands mining or processing.

16 Claims, 2 Drawing Sheets

(51) Int. Cl.
  *B01D 21/01* (2006.01)
  *B01D 21/26* (2006.01)
  *C02F 1/28* (2006.01)
  *C02F 1/56* (2006.01)
  *C02F 1/00* (2006.01)
  *C02F 11/12* (2006.01)
  *C02F 101/32* (2006.01)
  *C02F 103/10* (2006.01)

(52) U.S. Cl.
  CPC ............... *C02F 1/288* (2013.01); *C02F 1/56* (2013.01); *C02F 1/001* (2013.01); *C02F 1/281* (2013.01); *C02F 1/283* (2013.01); *C02F 1/285* (2013.01); *C02F 1/286* (2013.01); *C02F 11/12* (2013.01); *C02F 11/121* (2013.01); *C02F 2101/32* (2013.01); *C02F 2103/10* (2013.01)
  USPC ........... 210/710; 210/714; 210/702; 210/726; 210/727; 210/728; 210/723; 210/767; 210/788

(56) References Cited

U.S. PATENT DOCUMENTS

| | | | |
|---|---|---|---|
| 3,932,275 A | 1/1976 | Mewes et al. | |
| 3,996,696 A | 12/1976 | Davidtz | |
| 4,346,010 A * | 8/1982 | Ogino et al. | 210/714 |
| 4,363,749 A | 12/1982 | Weiss et al. | |
| 4,498,993 A | 2/1985 | Raba, Jr. et al. | |
| 4,569,768 A | 2/1986 | McKinley | |
| 4,882,066 A | 11/1989 | Portier | |
| 4,913,585 A | 4/1990 | Thompson et al. | |
| 5,073,272 A | 12/1991 | O'Neill et al. | |
| 5,190,660 A | 3/1993 | Lindoy et al. | |
| 5,393,435 A | 2/1995 | Deans et al. | |
| 5,433,865 A | 7/1995 | Laurent | |
| 5,449,464 A | 9/1995 | El-Shall | |
| 5,453,206 A | 9/1995 | Browne | |
| 5,512,526 A | 4/1996 | Greco | |
| 5,543,056 A | 8/1996 | Murcott et al. | |
| 5,635,073 A * | 6/1997 | Aktor et al. | 210/714 |
| 5,703,272 A | 12/1997 | Abe et al. | |
| 5,798,046 A | 8/1998 | Greer et al. | |
| 5,843,315 A | 12/1998 | Baughn et al. | |
| 6,042,732 A | 3/2000 | Jankowski et al. | |
| 6,203,711 B1 | 3/2001 | Moffett | |
| 6,214,237 B1 | 4/2001 | Kustra et al. | |
| 6,890,431 B1 | 5/2005 | Eades et al. | |
| 6,919,031 B2 | 7/2005 | Blumenschein et al. | |
| 7,001,525 B2 | 2/2006 | Binot et al. | |
| 7,153,436 B2 * | 12/2006 | Bair et al. | 210/709 |
| 7,255,793 B2 | 8/2007 | Cort | |
| 7,901,583 B2 | 3/2011 | McColl et al. | |
| 8,187,470 B2 | 5/2012 | Wang et al. | |
| 8,349,188 B2 | 1/2013 | Soane et al. | |
| 8,353,641 B2 | 1/2013 | Berg et al. | |
| 8,557,123 B2 | 10/2013 | Berg et al. | |
| 2002/0139754 A1 | 10/2002 | Miller | |
| 2003/0153001 A1 | 8/2003 | Soane et al. | |
| 2004/0116304 A1 | 6/2004 | Wu et al. | |
| 2005/0150844 A1 * | 7/2005 | Hyndman et al. | 210/750 |
| 2006/0151360 A1 | 7/2006 | Wright et al. | |
| 2007/0085055 A1 * | 4/2007 | Sikes et al. | 252/88.1 |
| 2007/0209971 A1 | 9/2007 | Duyvesteyn et al. | |
| 2007/0289911 A1 * | 12/2007 | Cymerman et al. | 210/195.1 |
| 2009/0206040 A1 | 8/2009 | Berg et al. | |
| 2010/0098493 A1 | 4/2010 | McColl et al. | |
| 2011/0252701 A1 | 10/2011 | Soane et al. | |
| 2012/0029120 A1 | 2/2012 | Soane et al. | |
| 2012/0061321 A1 | 3/2012 | Soane et al. | |
| 2013/0134103 A1 | 5/2013 | Berg et al. | |
| 2013/0193078 A1 | 8/2013 | Soane et al. | |

FOREIGN PATENT DOCUMENTS

| | | | |
|---|---|---|---|
| WO | 2004/060819 A1 | 7/2004 | |
| WO | 2006047225 A2 | 5/2006 | |
| WO | 2010098786 A1 | 9/2010 | |

OTHER PUBLICATIONS

U.S. Appl. No. 12/908,718, Soane et al.
Blumenschein, C. D., et al., "Sand Ballasted High Rate Clarification Process for Treatment of Process Water," available online at http://web.cecs.pdx.edu/~fishw/UO_Ballast-Actiflo.pdf. Oct. 2006.
"Actiflo™ Process : Key to Efficient High-Rate Clarification," available online at http://www.veoliawaterst.com/indepth/mining_fluent/13262,actiflo_process.htm.
Muylwyk, Q., et al., "Practical experiences in sand ballasted clarification processes," Proceedings of the Annual Conference of the Western Canada Water and Wastewater Association, Abstract (2004).
U.S. Appl. No. 13/050,105, filed Mar. 17, 2011.
Co-pending U.S. Appl. No. 13/788,936, David S. Soane, et al., 2013.
Zhang, et al. "Development of an Ultra-fine Coal Dewatering Technology and an Integrated Flotation-Dewatering System for Coal Preparation Plants". DOE Grant Final Report. Mar. 1, 2007.
Mathew, B., et al., "Metal complexation of crosslinked polyacrylamide-supported dithiocarbamates: Effect of the molecular character and extent of crosslinking on complexation," Proc. Indian Acad. Sci., 104(1): 43-56 (1991).

\* cited by examiner

SYSTEM, METHODS, PROCESSES AND APPARATUS FOR REMOVING FINELY DISPERSED PARTICULATE MATTER FROM A FLUID STREAM

RELATED APPLICATION

This application claims the benefit of U.S. Provisional Application No. 61/255,155, filed on Oct. 27, 2009. The entire teachings of the above application are incorporated herein by reference.

PARTIES TO A JOINT RESEARCH AGREEMENT

Soane Energy, LLC and Soane Mining, LLC are parties to a "joint research agreement" as defined in 35 U.S.C. 103(c)(3).

BACKGROUND

Fine materials generated from mining activities are often found well-dispersed in aqueous environments, such as wastewater. The finely dispersed materials may include such solids as various types of clay materials, recoverable materials, fine sand and silt. Separating these materials from the aqueous environment can be difficult, as they tend to retain significant amounts of water, even when separated out, unless special energy-intensive dewatering processes or long-term settling practices are employed.

An example of a high volume water consumption process is the processing of naturally occurring ores, such as coal and oil sands. Naturally occurring ores are heterogeneous mixtures of hydrophobic organic molecules or materials and solid inorganic matter. During the processing of such ores, colloidal particles, such as clay and mineral fines, are released into the aqueous phase often due to the introduction of mechanical shear. In certain embodiments, this shear is associated with the hydrocarbon-extraction process. In addition to mechanical shear, alkali water is sometimes added during extraction, creating an environment more suitable for colloidal suspensions. A common method for disposal of the resulting "tailing" solutions, which contain fine colloidal suspensions of clay and minerals, water, sodium hydroxide and small amounts of remaining hydrocarbon, is to store them in "tailings ponds". These ponds take years to settle out the contaminating fines, making the water unsuitable for recycling.

As an alternative, we have developed alternative technologies to treat tailings so that they are separated into a solid phase and a liquid phase, as disclosed in PCT/US09/54278, the entire teachings of which are hereby incorporated by reference. After this separation, they can coexist in a semi-solid, semifluid slurry until they are transported to their final destination. The formed solids need to be disposed of by beaching or other means of deposition.

During the transport process to its place of deposition, the mechanical properties of the slurry become important, especially shear resistance. For example, the high rate of fluid flow during transport can cause shear stress to be applied to the solid materials in suspension. Methods for tailings treatment such as coagulation and flocculation may not survive these mechanical stresses, and the solid aggregates can degrade, forming a stratified deposit of sand and fines while resuspending some fine in any remaining water. Commonly, to transport the formed solids or slurries containing them centrifugal pumps or positive displacement pumps may be used. Such pumps can exert shear on the solids, so that they break apart under such stresses. If the solid responds to the shear stress by regenerating fines, or if the solid segregates into layers (e.g., with a top-most layer containing more fines and the lower layers containing more sand), then the desired separation of the slurry into a recyclable water component and a reusable solid component will not be accomplished. Therefore, a need exists for a process that can withstand stresses such as pumping and high-flow, high-shear transport systems while producing the desired geotechnical properties in the separated tailings when they are deposited.

SUMMARY

Disclosed herein is a system for removing fine particulate matter from a fluid, comprising: an inflow fluid stream comprising fine particulate matter and coarse particulate matter suspended therein; an initial separator for separating the inflow fluid stream into an overflow fluid path comprising the suspended fine particulate matter and an underflow fluid path comprising the suspended coarse particulate matter; a tether injector that introduces into the underflow path a tethering material capable of being affixed to the coarse particulate matter to form tether-bearing anchor particles, said tether-bearing anchor particles being suspended in a treated fluid stream, said treated fluid stream admixing with the overflow fluid path to form a conjoined fluid stream; an activator injector that introduces into the conjoined fluid stream an activating material capable of being affixed to the fine particulate matter to form activated particles, said activated particles interacting with the tether-bearing anchor particles to form removable complexes; and a settling facility, where the removable complexes are separated from the conjoined treated fluid stream, thereby removing fine particulate matter from the fluid.

In an embodiment, the system for removing fine particulate matter from a fluid comprises a separator that separates an inflow fluid stream into an overflow fluid path containing suspended fine particulate matter, and an underflow fluid path; a tether injector for injecting tether-bearing anchor particles into the underflow fluid path to form a treated underflow fluid path; a first activator injector for injecting a first activator material into the overflow fluid path to form a treated overflow fluid path, wherein the first activator material complexes with the fine particulate matter to form a first set of activated particles; a commingler to join the treated underflow fluid path and the treated overflow fluid path to form a conjoined fluid stream; a second activator injector for injecting a second activator material into the conjoined fluid stream, wherein the second activator material complexes with residual fine particulate matter to form a second set of activated particles, wherein the tether-bearing anchor particles interact with the first and second sets of activated particles to form removable complexes; and a settling facility where the removable complexes are separated from the conjoined treated fluid stream, thereby removing fine particulate matter from the fluid.

The invention also encompasses a method for removing fine particulate matter from a fluid, comprising: separating an inflow fluid stream comprising fine particulate matter and coarse particulate matter suspended therein into an overflow fluid path comprising the suspended fine particulate matter and an underflow fluid path comprising the suspended coarse particulate matter; introducing into the underflow path a tethering material capable of being affixed to the coarse particulate matter to form tether-bearing anchor particles, said tether-bearing anchor particles being suspended in a treated fluid stream; admixing the overflow fluid path with the treated fluid stream to form a conjoined fluid stream; introducing into the conjoined fluid stream an activating material capable of being affixed to the fine particulate matter to form activated particles, wherein said activated particles are capable of interacting with the anchor particles to form removable complexes; combining the activated particles with the tether-bearing anchor particles to form removable complexes; and separating the removable complexes from the conjoined fluid stream, thereby removing fine particulate matter from the fluid. In embodiments, the method may also comprise removing bitumen from the fluid before the addition of the activating material. In embodiments, the method may further comprise adding an additional activating material to the overflow fluid path before admixing the overflow fluid path with the treated fluid path. In certain aspects, the additional activating material is the same as the activating material introduced into the conjoined fluid stream.

The invention additionally encompasses a method for removing fine particulate matter from a fluid comprising: separating an inflow fluid stream into an overflow fluid path containing suspended fine particulate matter and an underflow fluid path; introducing tether-bearing anchor particles into the underflow fluid path to form a treated underflow fluid path; introducing a first activator material into the overflow fluid path to form a treated overflow fluid path, wherein the first activator material complexes with the fine particulate matter to form a first set of activated particles; admixing the treated underflow fluid path and the treated overflow fluid path to form a conjoined fluid stream; introducing a second activator material into the conjoined fluid stream, wherein the second activator material complexes with residual fine particulate matter to form a second set of activated particles, wherein the tether-bearing anchor particles interact with the first and second sets of activated particles to form removable complexes; and separating the removable complexes from the conjoined treated fluid stream, thereby removing fine particulate matter from the fluid.

DETAILED DESCRIPTION

Figure 1A:
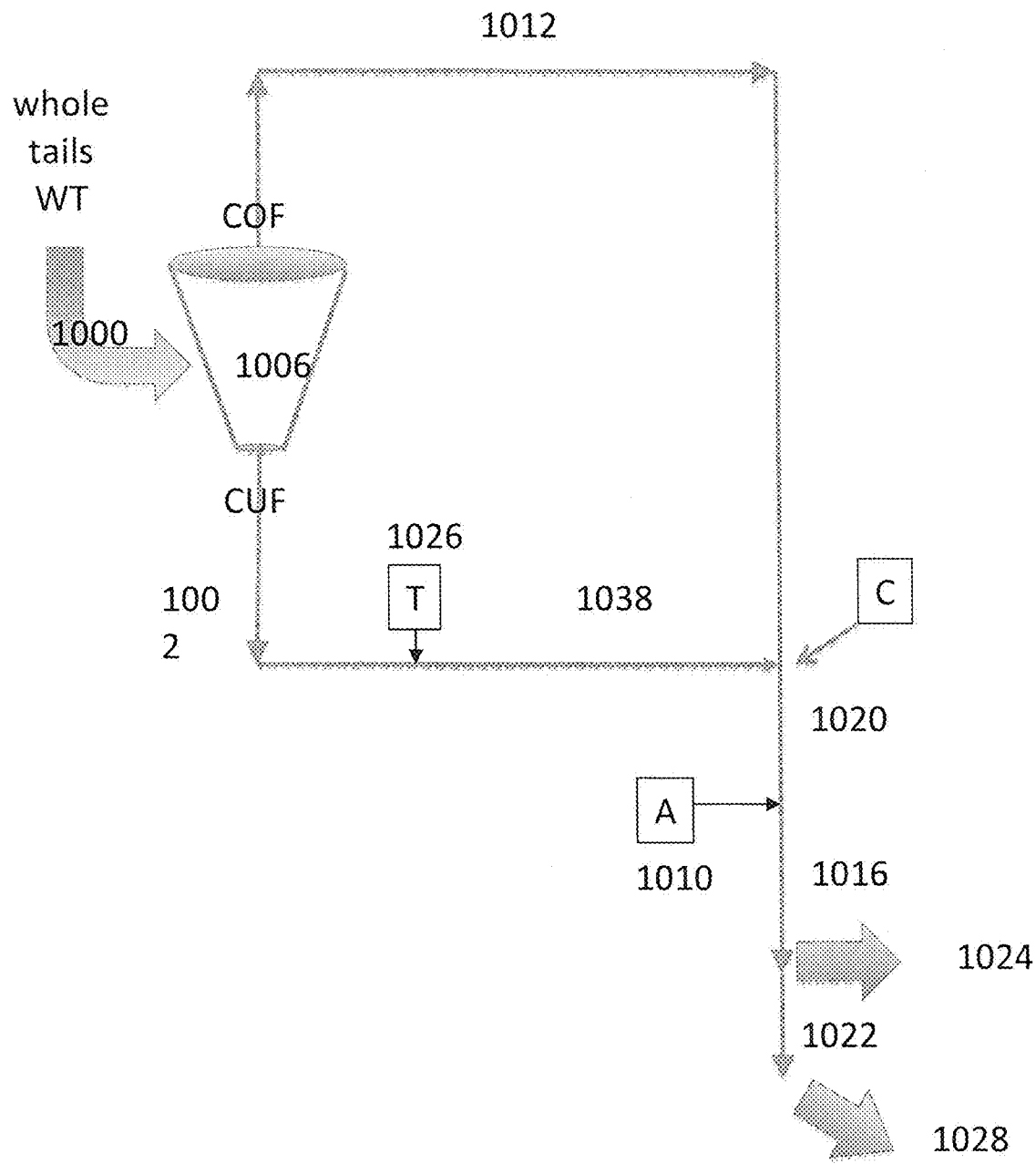
FIGS. 1A-B show diagrams of fluid separation processes.

Disclosed herein are systems and methods for enhancing the settlement rate of dispersed fine materials by incorporating them within a coarser particulate matrix, so that solids can be removed from aqueous suspension as a material having mechanical stability. The systems and methods disclosed herein involve three components: activating the fine particles, tethering them to anchor particles, and sedimenting the fine particle-anchor particle complex.

1. Activation

As used herein, the term "activation" refers to the interaction of an activating material, such as a polymer, with suspended particles in a liquid medium, such as an aqueous solution. An "Activator polymer" can carry out this activation. In embodiments, high molecular weight polymers can be introduced into the particulate dispersion as Activator polymers, so that these polymers interact, or complex, with fine particles. The polymer-particle complexes interact with other similar complexes, or with other particles, and form agglomerates.

This "activation" step can function as a pretreatment to prepare the surface of the fine particles for further interactions in the subsequent phases of the disclosed system and methods. For example, the activation step can prepare the surface of the fine particles to interact with other polymers that have been rationally designed to interact therewith in an optional, subsequent "tethering" step, as described below. Not to be bound by theory, it is believed that when the fine particles are coated by an activating material such as a polymer, these coated materials can adopt some of the surface properties of the polymer or other coating. This altered surface character in itself can be advantageous for sedimentation, consolidation and/or dewatering. In another embodiment, activation can be accomplished by chemical modification of the particles. For example, oxidants or bases/alkalis can increase the negative surface energy of particulates, and acids can decrease the negative surface energy or even induce a positive surface energy on suspended particulates. In another embodiment, electrochemical oxidation or reduction processes can be used to affect the surface charge on the particles. These chemical modifications can produce activated particulates that have a higher affinity for tethered anchor particles as described below.

Particles suitable for modification, or activation, can include organic or inorganic particles, or mixtures thereof. Inorganic particles can include one or more materials such as calcium carbonate, dolomite, calcium sulfate, kaolin, talc, titanium dioxide, sand, diatomaceous earth, aluminum hydroxide, silica, other metal oxides and the like. Sand or other fine fraction of the solids recovered from the mining process itself is a preferred particle source for activation. Organic particles can include one or more materials such as starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, may comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In embodiments, plastic materials may be used as particles. Both thermoset and thermoplastic resins may be used to form plastic particles. Plastic particles may be shaped as solid bodies, hollow bodies or fibers, or any other suitable shape. Plastic particles can be formed from a variety of polymers. A polymer useful as a plastic particle may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include, e.g., polyether polyurethanes and polyester polyurethanes. Plastics may also be obtained for these uses from waste plastic, such as post-consumer waste including plastic bags, containers, bottles made of high density polyethylene, polyethylene grocery store bags, and the like.

In embodiments, plastic particles can be formed as expandable polymeric pellets. Such pellets may have any geometry useful for the specific application, whether spherical, cylindrical, ovoid, or irregular. Expandable pellets may be pre-expanded before using them. Pre-expansion can take place by heating the pellets to a temperature above their softening point until they deform and foam to produce a loose composition having a specific density and bulk. After pre-expansion, the particles may be molded into a particular shape and size. For example, they may be heated with steam to cause them to fuse together into a lightweight cellular material with a size and shape conforming to the mold cavity. Expanded pellets may be 2-4 times larger than unexpanded pellets. As examples, expandable polymeric pellets may be formed from polystyrenes and polyolefins. Expandable pellets are available in a variety of unexpanded particle sizes. Pellet sizes, measured along the pellet's longest axis, on a weight average basis, can range from about 0.1 to 6 mm.

In embodiments, the expandable pellets may be formed by polymerizing the pellet material in an aqueous suspension in the presence of one or more expanding agents, or by adding the expanding agent to an aqueous suspension of finely subdivided particles of the material. An expanding agent, also called a "blowing agent," is a gas or liquid that does not dissolve the expandable polymer and which boils below the softening point of the polymer. Blowing agents can include lower alkanes and halogenated lower alkanes, e.g., propane, butane, pentane, cyclopentane, hexane, cyclohexane, dichlorodifluoromethane, and trifluorochloromethane, and the like. Depending on the amount of blowing agent used and the technique for expansion, a range of expansion capabilities exist for any specific unexpanded pellet system. The expansion capability relates to how much a pellet can expand when heated to its expansion temperature. In embodiments, elastomeric materials can be used as particles. Particles of natural or synthetic rubber can be used, for example.

In embodiments, the particle can be substantially larger than the fine particulates it is separating out from the process stream. For example, for the removal of particulate matter with approximate diameters less than 50 microns, particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be used as the particle to be modified for removing particulate matter from the waste stream (tailings) of oil sands mining.

It is envisioned that the complexes formed from the modified particles and the particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

The "activation" step may be performed using flocculants or other polymeric substances. Preferably, the polymers or flocculants can be charged, including anionic or cationic polymers.

In embodiments, anionic polymers can be used, including, for example, olefinic polymers, such as polymers made from polyacrylate, polymethacrylate, partially hydrolyzed polyacrylamide, and salts, esters and copolymers thereof (such as (sodium acrylate/acrylamide) copolymers), sulfonated polymers, such as sulfonated polystyrene, and salts, esters and copolymers thereof. Suitable polycations include: polyvinylamines, polyallylamines, polydiallyldimethylammoniums (e.g., the chloride salt), branched or linear polyethyleneimine, crosslinked amines (including epichlorohydrin/dimethylamine, and epichlorohydrin/alkylenediamines), quaternary ammonium substituted polymers, such as (acrylamide/dimethylaminoethylacrylate methyl chloride quat) copolymers and trimethylammoniummethylene-substituted polystyrene, and the like. Nonionic polymers suitable for hydrogen bonding interactions can include polyethylene oxide, polypropylene oxide, polyhydroxyethylacrylate, polyhydroxyethylmethacrylate, and the like. In embodiments, an activator such as polyethylene oxide can be used as an activator with a cationic tethering material in accordance with the description of tethering materials below. In embodiments, activator polymers with hydrophobic modifications can be used. Flocculants such as those sold under the trademark Magnafloc® by Ciba Specialty Chemicals can be used.

In embodiments, activators such as polymers or copolymers containing carboxylate, sulfonate, phosphonate, or hydroxamate groups can be used. These groups can be incorporated in the polymer as manufactured, alternatively they can be produced by neutralization of the corresponding acid groups, or generated by hydrolysis of a precursor such as an ester, amide, anhydride, or nitrile group. The neutralization or hydrolysis step could be done on site prior to the point of use, or it could occur in situ in the process stream.

The activated particle can also be an amine functionalized or modified particle. As used herein, the term "modified particle" can include any particle that has been modified by the attachment of one or more amine functional groups as described herein. The functional group on the surface of the particle can be from modification using a multifunctional coupling agent or a polymer. The multifunctional coupling agent can be an amino silane coupling agent as an example. These molecules can bond to a particle surface (e.g., metal oxide surface) and then present their amine group for interaction with the particulate matter. In the case of a polymer, the polymer on the surface of the particles can be covalently bound to the surface or interact with the surface of the particle and/or fiber using any number of other forces such as electrostatic, hydrophobic, or hydrogen bonding interactions. In the case that the polymer is covalently bound to the surface, a multifunctional coupling agent can be used such as a silane coupling agent. Suitable coupling agents include isocyano silanes and epoxy silanes as examples. A polyamine can then react with an isocyano silane or epoxy silane for example. Polyamines include polyallyl amine, polyvinyl amine, chitosan, and polyethylenimine.

In embodiments, polyamines (polymers containing primary, secondary, tertiary, and/or quaternary amines) can also self-assemble onto the surface of the particles or fibers to functionalize them without the need of a coupling agent. For example, polyamines can self-assemble onto the surface of the particles through electrostatic interactions. They can also be precipitated onto the surface in the case of chitosan for example. Since chitosan is soluble in acidic aqueous conditions, it can be precipitated onto the surface of particles by suspending the particles in a chitosan solution and then raising the solution pH.

In embodiments, the amines or a majority of amines are charged. Some polyamines, such as quaternary amines are fully charged regardless of the pH. Other amines can be charged or uncharged depending on the environment. The polyamines can be charged after addition onto the particles by treating them with an acid solution to protonate the amines. In embodiments, the acid solution can be non-aqueous to prevent the polyamine from going back into solution in the case where it is not covalently attached to the particle.

The polymers and particles can complex via forming one or more ionic bonds, covalent bonds, hydrogen bonding and combinations thereof, for example. Ionic complexing is preferred.

Figure 1B:
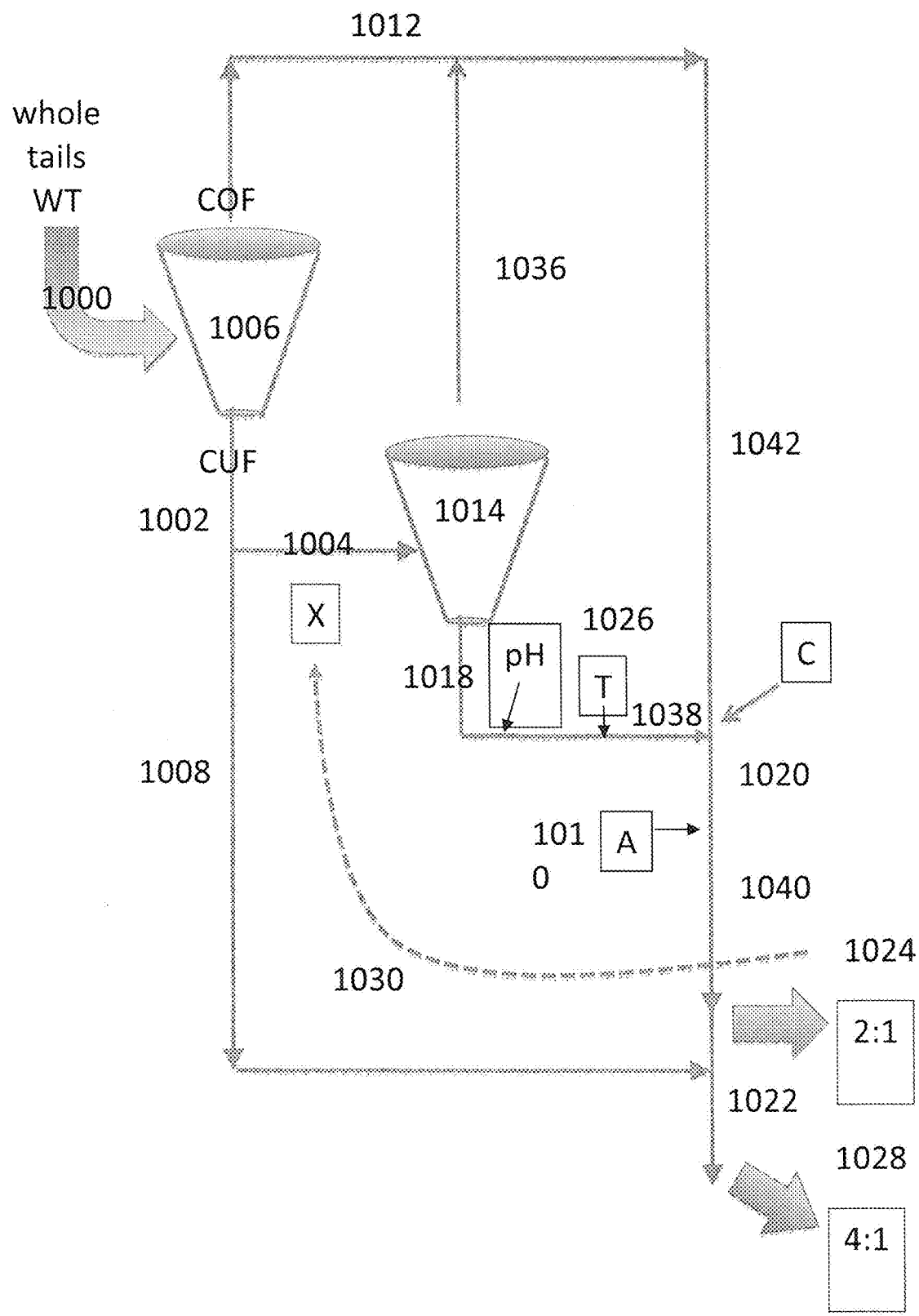

To obtain activated fine materials, the activator could be introduced into a liquid medium through several different means. For example, a large mixing tank could be used to mix an activating material with tailings from oil sands processing bearing fine particulate materials. Alternatively, the activating material can be added along a transport pipeline and mixed, for example, by the turbulence encountered in fluid transport, optionally aided by a static mixer or series of baffles. Activated particles are produced that can be treated with one or more subsequent steps of tethering and anchor-separation. Examples of processes and apparatus for introducing an activating agent into a liquid medium to contact fine particulate matter are illustrated in FIGS. 1A-B, and are described in more detail below.

The particles that can be activated are generally fine particles that are resistant to sedimentation. Examples of particles that can be filtered or otherwise removed in accordance with the invention include metals, sand, inorganic, or organic particles. The methods and products of the invention are particularly useful to isolate particles generated from mining operations, such as oil sands processing or other mineral retrieval operations or other bitumen associated solids. The particles are generally fine particles, such as particles having a mean diameter of less than 50 microns or particle fraction that remains with the filtrate following a filtration with, for example, a 325 mesh filter such as a Tyler sieve. The particles to be removed in the processes described herein are also referred to as "fines."

2. Tethering

As used herein, the term "tethering" refers to an interaction between an activated fine particle and an anchor particle (as described below). The anchor particle can be treated or coated with a tethering material. The tethering material, such as a polymer, forms a complex or coating on the surface of the anchor particles such that the tethered anchor particles have an affinity for the activated fines. In embodiments, the selection of tether and activator materials is intended to make the two solids streams complementary so that the activated fine particles become tethered, linked or otherwise attached to the anchor particle. When attached to activated fine particles via tethering, the anchor particles enhance the rate and completeness of sedimentation or removal of the fine particles.

In accordance with these systems and methods, the tethering material acts as a complexing agent to affix the activated particles to an anchor material. In embodiments, sand can be used as an anchor material, as may a number of other substances, as set forth in more detail below. In embodiments, a tethering material can be any type of material that interacts strongly with the activating material and that is connectable to an anchor particle.

As used herein, the term "anchor particle" refers to a particle which facilitates the separation of fine particles. Generally, anchor particles have a density that is greater than the liquid process stream. For example, anchor particles that have a density of greater than 1.3 g/cc can be used. Additionally or alternatively, the density of the anchor particles can be greater than the density of the fine particles or activated particles. Alternatively, the density is less than the dispersal medium, or density of the liquid or aqueous stream. Alternatively, the anchor particles are simply larger than the fine particles or the activated fine particles. A difference in density or particle size facilitates separating the solids from the medium.

For example, for the removal of particulate matter with an approximate mean diameter less than 50 microns, anchor particles may be selected having larger dimensions, e.g., a mean diameter of greater than 70 microns. An anchor particle for a given system can have a shape adapted for easier settling when compared to the target particulate matter: spherical particles, for example, may advantageously be used as anchor particles to remove particles with a flake or needle morphology. In other embodiments, increasing the density of the anchor particles may lead to more rapid settlement. Alternatively, less dense anchors may provide a means to float the fine particles, using a process to skim the surface for removal. In this embodiment, one may choose anchor particles having a density of less than about 0.9 g/cc, for example, 0.5 g/cc, to remove fine particles from an aqueous process stream.

Advantageously, anchor particles can be selected that are indigenous to a particular geographical region where the particulate removal process would take place. For example, sand can be used as the anchor particle for use in removing fine particulate matter from the waste stream (tailings) of oil sands mining.

Suitable anchor particles can be formed from organic or inorganic materials, or any mixture thereof. Particles suitable for use as anchor particles can include organic or inorganic particles, or mixtures thereof. Inorganic particles can include one or more materials such as calcium carbonate, dolomite, calcium sulfate, kaolin, talc, titanium dioxide, sand, diatomaceous earth, aluminum hydroxide, silica, other metal oxides and the like. The coarse fraction of the solids recovered from the mining process itself, is a preferred particle source for anchor particles. Organic particles can include one or more materials such as starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, may comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In embodiments, plastic materials may be used as particles. Both thermoset and thermoplastic resins may be used to form plastic particles. Plastic particles may be shaped as solid bodies, hollow bodies or fibers, or any other suitable shape. Plastic particles can be formed from a variety of polymers. A polymer useful as a plastic particle may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include, e.g., polyether polyurethanes and polyester polyurethanes. Plastics may also be obtained for these uses from waste plastic, such as post-consumer waste including plastic bags, containers, bottles made of high density polyethylene, polyethylene grocery store bags, and the like.

In embodiments, plastic particles can be formed as expandable polymeric pellets. Such pellets may have any geometry useful for the specific application, whether spherical, cylindrical, ovoid, or irregular. Expandable pellets may be pre-expanded before using them. Pre-expansion can take place by heating the pellets to a temperature above their softening point until they deform and foam to produce a loose composition having a specific density and bulk. After pre-expansion, the particles may be molded into a particular shape and size. For example, they may be heated with steam to cause them to fuse together into a lightweight cellular material with a size and shape conforming to the mold cavity. Expanded pellets may be 2-4 times larger than unexpanded pellets. As examples, expandable polymeric pellets may be formed from polystyrenes and polyolefins. Expandable pellets are available in a variety of unexpanded particle sizes. Pellet sizes, measured along the pellet's longest axis, on a weight average basis, can range from about 0.1 to 6 mm.

In embodiments, the expandable pellets may be formed by polymerizing the pellet material in an aqueous suspension in the presence of one or more expanding agents, or by adding the expanding agent to an aqueous suspension of finely subdivided particles of the material. An expanding agent, also called a "blowing agent," is a gas or liquid that does not dissolve the expandable polymer and which boils below the softening point of the polymer. Blowing agents can include lower alkanes and halogenated lower alkanes, e.g., propane, butane, pentane, cyclopentane, hexane, cyclohexane, dichlorodifluoromethane, and trifluorochloromethane, and the like. Depending on the amount of blowing agent used and the technique for expansion, a range of expansion capabilities exist for any specific unexpanded pellet system. The expansion capability relates to how much a pellet can expand when heated to its expansion temperature. In embodiments, elastomeric materials can be used as particles. Particles of natural or synthetic rubber can be used, for example.

In embodiments, the particle can be substantially larger than the fine particulates it is separating out from the process stream. For example, for the removal of particulate matter with approximate diameters less than 50 microns, particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be used as the particle to be modified for removing particulate matter from the waste stream (tailings) of oil sands mining.

It is envisioned that the complexes formed from the modified particles and the particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

Anchor particle sizes (as measured as a mean diameter) can have a size up to few hundred microns, preferably greater than about 70 microns. In certain embodiments, macroscopic anchor particles up to and greater than about 1 mm may be suitable. Recycled materials or waste, particularly recycled materials and waste having a mechanical strength and durability suitable to produce a product useful in building roads and the like are particularly advantageous.

As an example of a tethering material used with an anchor particle in accordance with these systems and methods, chitosan can be precipitated onto sand particles, for example, via pH-switching behavior. The chitosan can have affinity for anionic systems that have been used to activate fine particles. In one example, partially hydrolyzed polyacrylamide polymers can be used to activate particles, resulting in a particle with anionic charge properties. The cationic charge of the chitosan will attract the anionic charge of the activated particles, to attach the sand particles to the activated fine particles.

In embodiments, various interactions such as electrostatic, hydrogen bonding or hydrophobic behavior can be used to affix an activated particle or particle complex to a tethering material complexed with an anchor particle. In the foregoing example, electrostatic interactions can govern the assembly of the activated fine particle complexes bearing the anionic partially-hydrolyzed polyacrylamide polymer and the cationic sand particles complexed with the chitosan tethering material.

In embodiments, polymers such as linear or branched polyethyleneimine can be used as tethering materials. It would be understood that other anionic or cationic polymers could be used as tethering agents, for example polydiallyldimethylammonium chloride (poly(DADMAC).

In other embodiments, cationic tethering agents such as epichlorohydrin dimethylamine (epi/DMA), styrene maleic anhydride imide (SMAI), polyethylene imide (PEI), polyvinylamine, polyallylamine, amine-aldehyde condensates, poly(dimethylaminoethyl acrylate methyl chloride quaternary) polymers and the like can be used. Advantageously, cationic polymers useful as tethering agents can include quaternary ammonium or phosphonium groups. Advantageously, polymers with quaternary ammonium groups such as poly(DADMAC) or epi/DMA can be used as tethering agents. In other embodiments, polyvalent metal salts (e.g., calcium, magnesium, aluminum, iron salts, and the like) can be used as tethering agents. In other embodiments cationic surfactants such as dimethyldialkyl(C8-C22)ammonium halides, alkyl (C8-C22)trimethylammonium halides, alkyl(C8-C22)dimethylbenzylammonium halides, cetyl pyridinium chloride, fatty amines, protonated or quaternized fatty amines, fatty amides and alkyl phosphonium compounds can be used as tethering agents. In embodiments, polymers having hydrophobic modifications can be used as tethering agents.

The efficacy of a tethering material, however, can depend on the activating material. A high affinity between the tethering material and the activating material can lead to a strong and/or rapid interaction there between. A suitable choice for tether material is one that can remain bound to the anchor surface, but can impart surface properties that are beneficial to a strong complex formation with the activator polymer. For example, a polyanionic activator can be matched with a polycationic tether material or a polycationic activator can be matched with a polyanionic tether material. In one embodiment, a poly(sodium acrylate-co-acrylamide) activator is matched with a chitosan tether material.

In hydrogen bonding terms, a hydrogen bond donor should be used in conjunction with a hydrogen bond acceptor. In embodiments, the tether material can be complementary to the chosen activator, and both materials can possess a strong affinity to their respective deposition surfaces while retaining this surface property.

In other embodiments, cationic-anionic interactions can be arranged between activated fine particles and tether-bearing anchor particles. The activator may be a cationic or an anionic material, as long as it has an affinity for the fine particles to which it attaches. The complementary tethering material can be selected to have affinity for the specific anchor particles being used in the system. In other embodiments, hydrophobic interactions can be employed in the activation-tethering system.

The anchor particle material is preferably added in an amount which permits a flowable slurry. For example, the particle material can be added in an amount greater than 1 gram/liter but less than the amount which results in a non-flowable sludge or slurry, amounts between about 1 to about 1000 grams/liter, preferably 5 to 100 g/l are often suitable. In some embodiments, it may be desirable to maintain the concentration of the anchor particles to 20 g/l or higher. The anchor particles may be fresh (unused) material, recycled, cleaned ballast, or recycled, uncleaned ballast.

In embodiments, for example when sand is chosen as an anchor particle, higher amounts of the particle material may be added. For example, sand can be added in a range between 1-300 gm/l, preferably between 50-300 gm/l, for example at a dosage level of 240 gm/l.

In certain embodiments, a fines stream may itself provide anchor particles, as is depicted illustratively in FIG. 1. For example, a fluid stream containing fines (e.g., a mature fine tailings stream or a cyclone overflow stream) can be split into two flow paths, with an activator being added to one stream and a tethering material being added to the other. When these two streams are recombined, the activator-tether-anchor complexation occurs, allowing the fines to be separated out of the fluid.

3. Settling

It is envisioned that the complexes formed from the anchor particles and the activated particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

In embodiments, the interactions between the activated fine particles and the tether-bearing anchor particles can enhance the mechanical properties of the complex that they form. For example, an activated fine particle or collection thereof can be durably bound to one or more tether-bearing anchor particles, so that they do not segregate or move from the position that they take on the particles. This property of the complex can make it mechanically more stable.

Increased compatibility of the activated fine materials with a denser (anchor) matrix modified with the appropriate tether polymer can lead to further mechanical stability of the resulting composite material. This becomes quite important when dealing with tailings resulting from mining. This composite material can then be further utilized within the project for road building, dyke construction, or even land reclamation, rather than simply left in a pond to settle at a much slower rate.

A variety of techniques are available for removing the activated-tethered-anchored (ATA) complexes from the fluid stream. For example, the tether-bearing anchor particles can be mixed into a stream carrying activated fine particles, and the complexes can then separated via a settling process such as gravity or centrifugation. In another method, the process stream carrying the activated fine particles could flow through a bed or filter cake of the tether-bearing anchor particles. In any of these methods, the modified particles interact with the fine particulates and pull them out of suspension so that later separation removes both modified particles and fine particulates.

As would be appreciated by artisans of ordinary skill, a variety of separation processes could be used to remove the complexes of modified particles and fine particulates. For example, if the anchor particles had magnetic properties, the complexes formed by the interaction of tether-bearing anchor particles and activated fine particulates could be separated using a magnetic field. As another example, if the tether-bearing anchor particles were prepared so that they were electrically conductive, the complexes formed by the interaction of tether-bearing anchor particles and activated fine particulates could be separated using an electric field.

As would be further appreciated by those of ordinary skill, tether-bearing anchor particles could be designed to complex with a specific type of activated particulate matter. The systems and methods disclosed herein could be used for complexing with organic waste particles, for example. Other activation-tethering-anchoring systems may be envisioned for removal of suspended particulate matter in fluid streams, including gaseous streams.

4. Application: In-Line Tailings Processing

Extraction of bitumen from oil sands can involve the use of hot water with a caustic agent applied to the mined oil sands ore. During this process, clay particulate matter bound up in the oil sands ore can be exfoliated, producing fine, charged clay particles ("fines") that remain suspended in the effluent fluid stream. The effluent fluid stream can be directed to a mechanical separator such as a cyclone that can separate the fluid stream into two components, an overflow fluid comprising fine tails that contains the fine (<approximately 50 micron) clay particles, and an underflow fluid stream that contains coarse tails, mainly sand, with a small amount of fine clay particles.

In embodiments, the systems and methods disclosed herein can treat each fluid stream (including, but not limited to, effluent fluid streams from bitumen extraction methods), an overflow fluid and/or an underflow fluid. The underflow fluid can be used for the preparation of tether-bearing anchor particles. However, it will be clear that other sources for anchor particles (e.g., sand) can also be used. The sand within the underflow fluid can act as an "anchor particle," as described above. A cationic tethering agent, as described above, can be introduced into the underflow fluid so that it self-assembles onto the surface of the anchor particles, creating a plurality of tether-bearing anchor particles.

Following this treatment, the tether-bearing anchor particles and fines stream can be re-mixed in a batch, semi-batch or continuous fashion. An activating agent, such as a polyanion as described above, can preferably be introduced into the fluid stream consisting of a homogenous mixture of tethered sand and fines, resulting in a flocculation of the fine particles that complex with the tethered sand. The tether-bearing anchor particles can interact, preferably electrostatically, with the activated, preferably flocculating, fine clay particles, forming large agglomerations of solid material that can be readily removed from or settled in the resulting fluid mixture.

In embodiments, the aforesaid systems and methods are amenable to incorporation within existing tailings separation systems. For example, a treatment process can be added in-line to each of the separate flows from the overflow and underflow fluids; treated fluids then re-converge to form a single fluid path from which the resulting agglomerations can be removed. Removal of the agglomerations can take place, for example, by filtration, centrifugation, sedimentation, decantation, or other type of mechanical separation.

In one embodiment, the fluid path containing the agglomerated solids can be subsequently treated by a conveyor belt system, analogous to those systems used in the papermaking industry. In an exemplary conveyor belt system, the mixture of fluids and agglomerated solids resulting from the electrostatic interactions described above can enter the system via a headbox. A moving belt containing a mechanical separator can move through the headbox, or the contents of the headbox are dispensed onto the moving belt, so that the wet agglomerates are dispersed along the moving belt. One type of mechanical separator can be a filter with a pore size smaller than the average size of the agglomerated particles. The size of the agglomerated particles can vary, depending upon the size of the constituent anchor particles (i.e., sand). For example, for systems where the sand component has a size between 50/70 mesh, an 80 mesh filter can be used. Other adaptations can be envisioned by artisans having ordinary skill in the art. Agglomerated particles can be transported on the moving belt and further dewatered. Optionally, mechanical pressure can be used to cause further dewatering of the agglomerated slurry, for example in a belt press. Water removed from the agglomerated particles and residual water from the headbox from which agglomerates have been removed can be collected in whole or in part within the system and optionally recycled for use in subsequent oil sands processing.

In embodiments, the filtration mechanism can be an integral part of the moving belt. In such embodiments, the captured agglomerates can be physically removed from the moving belt so that the filter can be cleaned and regenerated for further activity. In other embodiments, the filtration mechanism can be removable from the moving belt. In such embodiments, the spent filter can be removed from the belt and a new filter can be applied. In such embodiments, the spent filter can optionally serve as a container for the agglomerated particles that have been removed.

Advantageously, as the agglomerated particles are arrayed along the moving belt, they can be dewatered and/or dried. These processes can be performed, for example, using heat, air currents, or vacuums. Agglomerates that have been dewatered and dried can be formed as solid masses, suitable for landfill, construction purposes, or the like.

Desirably, the in-line tailings processing described above is optimized to capitalize upon the robustness and efficiency of the electrostatic interaction between the activated tailings and the tether-bearing anchor particles. Advantageously, the water is quickly removed from the fresh tailings during the in-line tailings processing, to minimize heat losses. Recycling this hot water saves energy: water that is already hot does not require as much heating to get it to an operational processing temperature, while recycling cold water, such as would be found in tailings ponds, requires a substantial amount of heating and resultant energy use. Illustrative examples of in-line processing are depicted in FIGS. 1A-B, and are described below.

As an illustrative embodiment, FIG. 1A depicts a system for removing fine particulate matter from a fluid, here a system for whole tails (WT) separation in accordance with this disclosure. As shown in FIG. 1A, an inflow stream comprising a whole tails stream 1000 enters a hydrocyclone or equivalent separator 1006 and is separated into two fluid streams, an overflow fluid stream COF and an underflow fluid stream CUF. The inflow stream comprises fine particulate matter and course particulate matter suspended therein. As depicted, the inflow stream comprises whole tails, wherein clay fines are suspended as fine particulate matter, and sand is suspended as coarse particulate matter. Following the separation of the inflow fluid stream, the overflow fluid stream COF contains the suspended clay fines resulting from the oil sands extraction process, and the underflow fluid stream CUF contains sand, also resulting from the oil sands extraction process. The COF fluid stream follows flow path 1012, termed the overflow path.

As shown in this Figure, the flow path 1002, termed the underflow path, carries the suspended coarse particulate matter that will be treated by contacting it with a tethering material capable of being affixed to the coarse particulate matter to form anchor particles. The tethering material is injected into the underflow path 1002 at point T via a tether injector 1026, understood to be a device or system configured to introduce a preselected dose of tethering material into the underflow path to complex with the coarse particulate matter to form anchor particles. Following introduction of the tethering material, the suspension in the underflow path forms a treated fluid stream 1038. It is understood that additional treatments of the underflow path, such as pH adjustment, can also be performed.

As depicted in FIG. 1A, the COF consisting of suspended fine particulate matter following the COF fluid path 1012 and the treated fluid stream 1038 can be admixed at a commingler C to form a conjoined fluid stream 1020. The activating material is injected into stream 1020 at point A via an activator injector 1010, understood to be a device or system configured to introduce a preselected dose of activating material into the desired path. The activator complexes with the treated coarse particulate matter while capturing fine particulate matted in the process. Introduction of the activator after the transportation of the combined streams insures the formed complexes are not compromised by the shear stress of transportation. The conjoined treated fluid stream 1016 forms removable complexes in accordance with the principles disclosed herein and can then be directed to one or more settling facilities 1024 and/or 1028, where the removable complexes are separated from the fluid in which they are suspended. As the removable complexes contain the fine particulate matter originally suspended in the fluid, separating the removable complexes out of the conjoined and treated fluid stream 1016 removes the fine particulate matter from the fluid. In certain embodiments, the entire conjoined treated fluid stream 1016 can be directed to a single settling facility 1024. In other embodiments, some of the conjoined treated fluid stream 1016 can be directed to a first settling facility 1024, while the remainder of the conjoined fluid stream follows a disposal path 1022 and is directed to a second settling facility 1028 for impoundment, or where removable complexes can be separated out, or where further treatment can be undertaken. For the purposes of this disclosure, the term "settling facility" can include any system, device, apparatus, process, or static facility where removable complexes are separated from the fluid in which they reside.

As another illustrative embodiment, FIG. 1B depicts a system for removing fine particulate matter from a fluid, here a system for whole tails (WT) separation in accordance with this disclosure. As shown in FIG. 1B, an inflow stream comprising a whole tails stream 1000 enters a hydrocyclone or equivalent separator 1006 and is separated into two fluid streams, an overflow fluid stream COF and an underflow fluid stream CUF.

In certain cases, depending upon the composition of the WT, the CUF contains a certain fraction of residual fines. For example between 2-20% of the CUF solids by weight can be comprised of residual fines. As an example, the CUF may be characterized by a 9:1 sand-to-fines ratio (SFR).

In the depicted embodiment, the underflow path 1002 for the CUF is split into two underflow subpaths 1004 and 1008, with a portion of the CUF being directed to each flow path. For example, 50% of the CUF can be directed to each flow path, although other ratios of CUF flow can be designated for each flow path, based on operational parameters for the specific separation process. The portion of underflow path 1002 that is directed to flow path 1004 is dependent upon the amount of tethered CUF solids needed to complex with the COF or MFT stream. For the purposes of this disclosure, each underflow subpath and its divisions into further underflow subpaths is to be considered an underflow path. For example, flow paths 1004 and 1018 in FIG. 1B are both underflow paths.

In a preferred embodiment, a portion of the CUF flow path 1002 is diverted to a first underflow subpath 1008 to follow a disposal path 1022 for disposal or impoundment at a facility 1028 without further chemical treatment. This action minimizes the amount of solids that require chemical treatment, making the process more economically viable. The amount of flow diverted to the first underflow subpath 1008 might be determined by a minimally acceptable level of tethered CUF solids required to create a suitable activator-tether-anchor (ATA) deposit in accordance with the systems and methods disclosed herein.

In the depicted embodiment, CUF in a second underflow subpath 1004 is directed to a second hydrocyclone or equivalent separator 1014 that further clarifies the CUF stream, removing more of the fines from the CUF stream in underflow subpath 1004. It is understood that the benefit of a second separator is to minimize the amount of tethering material required to treat the CUF solids, since the residual fines fraction of the CUF can have a high demand for tethering material. While the depicted embodiment contains two cyclones, it is understood that more than two cyclones could be used in a preselected sequence, for example, in series or in parallel. In embodiments, the overflow from the second separator 1014 could be directed along flow path 1036 to combine with the COF flow path 1012. In embodiments, the clarified CUF exiting the second hydrocyclone 1014 can have a SFR of about 19:1. Treatment of the CUF at the higher SFR can allow a lower and more cost-effective tether dose.

In embodiments, the CUF on the underflow path 1002 can be treated by adjusting its pH, either before or after the underflow path 1002 splits into subpaths. In the depicted embodiment, the CUF from the second separator 1014 can be treated by adjusting the pH as indicated at Point pH in the illustration, for example along fluid path 1018. In embodiments, the pH adjustment is added at a point after separation of the flow path 1002 into its subpaths 1004 and 1008, for example along path 1004 or along 1018, minimizing the amounts of pH adjusting chemicals needed. pH adjustment can alter the amount of treatment polymers utilized in treating the CUF streams in accordance with the depicted process. For example, a decrease in CUF pH from 8.5 to 6.5 can decrease the amount of tethering polymer that the system uses. In a preferred embodiment, the pH adjustment is conducted at Point pH after a second (or final) separator step and before addition of the tethering material at Point T, for example along fluid path 1018. In an embodiment, the pH adjustment substance and the tethering material can be added as a mixture, so that Point pH and Point T are substantially coincident. In an embodiment, Point pH and Point T are separated along the fluid path, with a preselected distance between them.

Following treatment in the second separator 1014, the clarified CUF follows fluid path 1018, where it is treated with a tethering polymer 1026 added at Point T, for example by means of an injector device. As used herein, the term "injector device" refers to any device or system that adds a chemical component into a fluid path. As has been previously described, the tethering polymer 1026 is a component of a chemical additive system to remove suspended fines. As has been previously described, this chemical additive system includes three components: 1) an Activator polymer added in small doses to a fluid stream bearing treated coarse particulate matter combined with fine particulate matter, 2) a Tethering polymer that has a high affinity for the Activator polymer, and 3) an Anchor particle upon which the Tethering polymer is coated. In the depicted process, the sand in the CUF acts as Anchor particles to which the Tethering polymers added through a tether injector 1026 attach at Point T to form a treated fluid stream 1038 bearing anchor particles.

Following attachment of the Tethering polymer 1026 to sand in the CUF, the treated CUF in the treated fluid stream 1038 is directed to admix with an overflow fluid stream 1042 bearing fine particles. The fine particles in the fluid stream 1042 are produced as follows. After initial separation of the whole tails inflow fluid stream 1000 in the separator 1006, a COF stream 1012 is produced containing the majority of the suspended clay fines from the whole tails. The overflow from the second separator 1014 is directed along fluid path 1036 to join with the overflow in fluid stream 1012 to form overflow path 1042. In the depicted embodiment, the COF follows overflow path 1042 to be mixed with the treated CUF material. In embodiments, the COF can be treated with an activator polymer at any point along COF paths 1012 or 1042.

The COF, whether treated with activator or untreated, following flow path 1042 joins with the treated CUF following flow path 1038 at a junction point or commingler C to form the conjoined stream 1020, where the Anchor particles coated with the Tethering polymer in the treated CUF mix with the fines in the COF. If the COF has been treated with activator, the activator combines with the tethering polymer borne by the anchor particles, so that activator-tether-anchor complexes are formed in the conjoined fluid stream 1020. The conjoined fluid stream 1020 can then be transported via centrifugal pumps or other means to the desired facility. The activating material is injected into stream 1020 at point A via an activator injector 1010, understood to be a device or system configured to introduce a preselected dose of activating material into the desired path. The activator complexes with the treated coarse particulate matter while capturing fine particulate matted in the process. Introduction of the activator after the transportation of the combined streams insures the formed complexes are not compromised by the shear stress of transportation. For a conjoined fluid stream 1020 where Anchor-Tether-Activator complexes have already formed (e.g., because an activator was added to one or both of the COF fluid streams 1012 and/or 1042), additional activator can be added at Point A to ensure that all the fines are complexed. For a conjoined fluid stream 1002 where only tether-bearing anchor particles have been previously added (e.g., at Point T), the addition of activator at point A results in the formation of Anchor-Tether-Activator complexes. The interaction of these components of the Anchor-Tether-Activator (ATA) system result in the formation of large, robust, solid clusters (i.e., the removable complexes), as previously described.

The fluid stream bearing these ATA clusters (not shown) can be directed along fluid path 1040 to a settling facility or other designated area 1024 where the clusters can be separated from recyclable water. The recyclable water retrieved from the settling process at 1024 can be re-introduced into the system at Point X via fluid path 1030, or can be used at other points within the system. In embodiments, a part of the conjoined fluid stream 1040 can be directed along a disposal path 1022 to a second facility 1028 for impoundment, or where removable complexes can be separated out, or where further treatment can be undertaken.

In embodiments, the ATA solids deposited in area 1024 might have a sand to fines ratio (SFR) of 2:1, compared to the whole tails stream 1000 that might contain a SFR of about 4:1. This lower SFR enables treatment with a lower total amount of tethering material. In other embodiments, the untreated stream 1008 might be combined with the ATA solids in stream 1040 to create stream 1022. This could enable co-disposal of untreated CUF 1008 without harming the performance of the ATA solids in disposal area 1028. The fully combined ratio of sand to fines (SFR) in area 1028 would be about 4:1. The 4:1 SFR solids in disposal area 1028 should have good drainage properties due to the sandy nature (i.e., 80% sand) of the deposit. The SFR values are listed as an example and it is understood that these values are variable.

While the depicted embodiments in FIGS. 1A and 1B show anchor particles being derived from the CUF as part of the tailings processing, it is understood that anchor particles can be introduced into the system that have not been derived directly from the CUF as shown in the Figures. For example, anchor particles can be provided from stockpiles of suitable materials that have been stockpiled and treated with tethering agents offline to form exogenous tether-bearing anchor particles. These exogenous tether-bearing anchor particles could be introduced into the fines-bearing fluid stream at any point along its fluid path. For example, the exogenous tether-bearing anchor particles, i.e., particles obtained from outside the CUF fluid stream and previously attached to tethers, could be introduced into the fines-bearing fluid stream to supplement the endogenous tether-bearing anchor particles in the treated fluid stream 1038 shown in the Figures. Such exogenous tether-bearing anchor particles could be introduced to the fines-bearing fluid stream prior to Point C or after Point C. It is further understood that exogenous tether-bearing anchor particles could be introduced into the fines-bearing fluid stream as a substitution for the treated CUF depicted in the Figures. Exogenous tether-bearing anchor particles can be derived from other tailings separation systems, where, for example, the particulate matter (e.g., sand) in the CUF can be segregated from the fluid stream and treated with tethering materials offline. In other embodiments, exogenous tether-bearing anchor particles can be derived from a variety of materials, as set forth above, and can be prepared with tethering materials; such exogenous tether-bearing anchor particles may be formed from different materials than the anchor particles derived from the CUF in the depicted embodiments. In embodiments, a plurality of tether-bearing anchor particles can be used, with the two or more anchor particles being formed from the same material or from different materials, and with the tether polymers being the same or different for each anchor.

With further reference to FIG. 1B, the processing of oil sands slurry as described herein can be adapted for recovering additional hydrocarbon, e.g., bitumen, from the fluid, either from the COF or the CUF (or both). Additional hydrocarbon recovery can yield numerous benefits. As an exemplary benefit, hydrocarbon that is collected is usable as a fuel source. As another exemplary benefit, with additional hydrocarbon recovered, the remaining tailings will contain less hydrocarbon contamination. As yet another exemplary benefit, polymer dosing requirements can be lower and/or less variable with less hydrocarbon load in the fluid stream.

As shown in FIG. 1B, an inflow stream comprising a whole tails stream 1000 enters a hydrocyclone equivalent separator 1006 and is separated into two fluid streams, an overflow fluid stream COF and an underflow fluid stream CUF. The shearing action of the separator 1006 can release additional residual hydrocarbons from the suspended solids contained in the whole tailings stream 1000. The whole tailings, CUF, and COF streams are commonly known to contain residual bitumen that was unrecovered in the extraction process. This residual bitumen concentration can range broadly from about 0 to about 5% by weight of the suspended solids, but economic methods of recovery have not been identified. In embodiments, the COF stream can be further processed by gas bubble flotation, vortex separation, hydrocyclone separation, or other mechanisms, to remove bitumen from the COF stream before the Activator is added as described previously. One example of an effective separator for this purpose is the Voraxial separator, manufactured by Enviro Voraxial Technology (www.evtn.com). As previously described, the Activator dose requirements can be higher or more variable in the presence of excess bitumen, so the process for removing particulates from the fluid stream can operate more efficiently.

EXAMPLES

The following materials were used in the Examples below:
Commercially available poly(acrylamide) (50% hydrolyzed) 15M MW;
Poly(diallyldimethylammonium chloride) (20% w/v);
Sigma Aldrich;
St. Louis, Mo.; and
Tailings solution (whole tails) from a low-grade tar sand.

Example 1

COF and CUF Preparation

Synthetic cyclone overflow (COF) and cyclone underflow (CUF) were prepared by letting a bucket of whole tails settle for 24 hours. The whole tails settled into three different fractions: water, fines, and sands. The fractions were then separated by siphoning and decanting. The water fraction was used as process water for dilutions. The fines fraction was assumed to be 100% fines (i.e., fine particulate matter suspended in water) and diluted to 10% solids and used as COF. The sands fraction was characterized (typically 80% solids and 95% sands and 5% fines) and diluted to 70% solids, and used as CUF.

Example 2

Tethered CUF

CUF prepared in accordance with Example 1 was tethered with 500 ppm (g/tonne of solids) of poly(diallyldimethylammonium chloride) (pDADMAC). The tethered CUF was combined with COF prepared in accordance with Example 1, to give a 4:1 SFR. The tethered CUF did not settle out fines from the supernatant.

Example 3

[Tethered CUF]+[800 ppm Activated COF]

CUF prepared in accordance with Example 1 was tethered with 500 ppm (g/tonne of solids) of pDADMAC. COF prepared in accordance with Example 1 was activated with 800 ppm poly(acrylamide) 50% hydrolyzed (PAAm) and combined with the tethered CUF to produce a 4:1 SFR slurry. The slurry was mixed until homogenous and allowed to settle in a 250 mL graduated cylinder. The settling rate corresponded approximately to 60 ft/hour. The bed height compacted to 130 mL and the turbidity was 100 NTU. The sample was sheared for 30 seconds and allowed to settle for 30 minutes. The solids separated into a top layer of fines and a bottom layer of fines and sands flocs. The supernatant had a high turbidity of >1000 NTU.

Example 4

[Tethered CUF]+[1000 ppm Activated COF]

CUF prepared in accordance with Example 1 was tethered with 500 ppm (g/tonne of solids) of pDADMAC. COF prepared in accordance with Example 1 was activated with 1000 ppm PAAm and combined with the tethered CUF to produce a 4:1 SFR slurry. The slurry was mixed until homogenous and allowed to settle in a 250 mL graduated cylinder. The solids settled immediately. The bed height compacted to 135 mL and the turbidity was 255 NTU. The sample was sheared for 30 seconds and allowed to settle for 30 minutes. The solids separated into a top layer of fines and a bottom layer of fines and sands flocs. The supernatant had a high turbidity of >1000 NTU.

Example 5

[Tethered CUF+COF] and 142 ppm Activator

CUF prepared in accordance with Example 1 was tethered with 500 ppm (g/tonne of solids) of pDADMAC. The tethered CUF was combined with COF prepared in accordance with Example 1 to produce a 4:1 SFR slurry. The produced slurry was sheared for 30 seconds and allowed to settle for 30 minutes. The slurry was activated with 142 ppm (g/tonne of solids) PAAm. The treated slurry was transferred to a 250 mL graduated cylinder to settle. The settling rate corresponded approximately to 30 ft/hour. The bed height compacted to 120 mL and the turbidity was 1000 NTU.

Example 6

[Tethered CUF+COF] and 177 ppm Activator

CUF prepared in accordance with Example 1 was tethered with 500 ppm (g/tonne of solids) of pDADMAC. The tethered CUF was combined with COF prepared in accordance with Example 1 to produce a 4:1 SFR slurry. The produced slurry was sheared for 30 seconds and allowed to settle for 30 minutes. The slurry was activated with 177 ppm (g/tonne of solids) PAAm. The treated slurry was transferred to a 250 ml, graduated cylinder to settle. The solids immediately settled. The bed height compacted to 130 mL and the turbidity was 253 NTU. The stress yield of the solids was 2205+/−180 Pa at 65.4% solids.

Example 7

[Tethered CUF+COF] and 212 ppm Activator

CUF prepared in accordance with Example 1 was tethered with 500 ppm (g/tonne of solids) of pDADMAC. The tethered CUF was combined with COF prepared in accordance with Example 1 to produce a 4:1 SFR. The produced slurry was sheared for 30 seconds and allowed to settle for 30 minutes. The slurry was activated with 212 ppm (g/tonne of solids) PAAm. The treated slurry was transferred to a 250 mL graduated cylinder to settle. The solids settled immediately. The bed height compacted to 138 mL and the turbidity was 292 NTU.

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method for removing fine particulate matter from a fluid, comprising:
    separating an inflow fluid stream comprising fine particulate matter and coarse particulate matter suspended therein into an overflow fluid path comprising the suspended fine particulate matter and an underflow fluid path comprising the suspended coarse particulate matter;
    introducing into the underflow path a tethering polymer to form a treated underflow path, wherein the tethering polymer affixes to the coarse particulate matter to form tether-bearing coarse particulate matter suspended in the treated underflow path, wherein the tethering polymer is an anionic polymer or a cationic polymer;
    admixing the overflow fluid path with the treated underflow path to form a conjoined fluid stream;
    introducing into the conjoined fluid stream an activating polymer that affixes to the fine particulate matter to form activated particles, wherein the activating polymer of said activated particles interacts with the tethering polymer of said tether-bearing coarse particulate matter to form removable complexes comprising the fine particulate matter and the coarse particulate matter; and
    separating the removable complexes from the conjoined fluid stream, thereby removing the fine particulate matter from the fluid,
    wherein when the tethering polymer is an anionic polymer, the activating polymer is a cationic polymer, and when the tethering polymer is a cationic polymer, the activating polymer is an anionic polymer.

2. The method of claim 1, further comprising adding an additional activating polymer to the overflow fluid path before admixing the overflow fluid path with the treated underflow path.

3. The method of claim 2, wherein the activating polymer introduced into the conjoined fluid stream and the additional activating polymer are the same.

4. The method of claim 1, wherein the inflow fluid stream is separated into an overflow path and an underflow path using a hydrocyclone.

5. The method of claim 1, wherein the conjoined fluid stream is transported to another location before introducing the activating polymer into the conjoined fluid stream.

6. The method of claim 1, wherein the fine particulate matter is generated from a mining operation.

7. The method of claim 1, wherein the underflow fluid path is split into a plurality of underflow fluid subpaths.

8. The method of claim 7, wherein a first underflow subpath contains untreated cyclone underflow fluid.

9. The method of claim 7, wherein a second underflow subpath is directed to a second separator that produces cyclone overflow and cyclone underflow.

10. The method of claim 9, wherein the second separator is a hydrocyclone.

11. The method of claim 9, wherein the cyclone underflow from the second separator is treated with the tethering polymer.

12. The method of claim 7, wherein one of the plurality of underflow subpaths is treated with the tethering polymer.

13. A method for removing fine particulate matter from a fluid comprising:
    separating an inflow fluid stream into an overflow fluid path containing suspended fine particulate matter, and an underflow fluid path;
    introducing tether polymer-bearing anchor particles into the underflow fluid path to form a treated underflow fluid path, wherein the tether polymer-bearing anchor particles are anchor particles to which tethering polymer is affixed and wherein the tethering polymer is an anionic polymer or a cationic polymer;
    introducing a first activator polymer into the overflow fluid path to form a treated overflow fluid path, wherein the first activator polymer complexes with the fine particulate matter to form a first set of activated particles;
    admixing the treated underflow fluid path and the treated overflow fluid path to form a conjoined fluid stream;
    introducing a second activator polymer into the conjoined fluid stream, wherein the second activator polymer complexes with fine particulate matter to form a second set of activated particles, wherein the tethering polymer of the tether polymer-bearing anchor particles interact with the first and second sets of activator polymers of the activated particles to form removable complexes comprising the fine particulate matter and the anchor particles; and
    separating the removable complexes from the conjoined treated fluid stream, thereby removing fine particulate matter from the fluid,
    wherein when the tethering polymer is an anionic polymer, the first and second activator polymers are cationic, and when the tethering polymer is a cationic polymer, the first and second activator polymers are anionic.

14. The method of claim 13, wherein the first activator polymer and the second activator polymer are the same.

15. The method of claim 13, wherein the conjoined fluid stream is transported to another location before introducing the second activating polymer into the conjoined fluid stream.

16. The method of claim 13, wherein the fine particulate matter is generated from a mining operation.

* * * * *